(12) United States Patent
Bergquist et al.

(10) Patent No.: US 6,457,765 B1
(45) Date of Patent: Oct. 1, 2002

(54) VEHICLE SEAT ARRANGEMENT

(75) Inventors: Åke Bergquist, Västra Frölunda; Göran Larsson, Torslanda; Anders Gunnarsson, Göteborg; Simon Lamarre, Västra Frölunda, all of (SE); Karin Reikerås, Dampierre-en-Y (FR); Kjell Reikerås, Hökerum (SE); Einar Lennartsson, Sollerbrunn (SE); Brigitta Thorsson, Varberg (SE)

(73) Assignee: Volvo Person Vagnar AG (SE)

( * ) Notice: Subject to any disclaimer, the term of this patent is extended or adjusted under 35 U.S.C. 154(b) by 0 days.

(21) Appl. No.: 09/681,900

(22) Filed: Jun. 21, 2001

Related U.S. Application Data

(63) Continuation of application No. PCT/SE99/02331, filed on Dec. 14, 1999.

(51) Int. Cl.$^7$ .................................................. B60N 2/12
(52) U.S. Cl. .................... 296/64; 296/65.09; 296/65.11
(58) Field of Search ................................. 296/64, 65.09, 296/65.11; 244/118.6, 122 R; 297/257

(56) References Cited

U.S. PATENT DOCUMENTS

| 4,157,797 A | | 6/1979 | Fox |
| 4,184,656 A | * | 1/1980 | Wakeley .................. 244/188.6 |
| 4,341,415 A | | 7/1982 | Braun et al. |
| 4,949,931 A | | 8/1990 | Fujiwara et al. |
| 5,636,884 A | * | 6/1997 | Ladetto et al. ........ 296/65.11 X |
| 6,315,352 B1 | * | 11/2001 | Normura .................. 296/64 X |

FOREIGN PATENT DOCUMENTS

| SE | 466252 B | 1/1992 |

\* cited by examiner

Primary Examiner—Dennis A. Pedder
(74) Attorney, Agent, or Firm—Howrey, Simon, Arnold & White LLP

(57) ABSTRACT

The present invention relates to a vehicle seating arrangement having a number of seats. The seats are arranged so that they can be moved between different mutual positions along at least two parallel rails that extend in the longitudinal direction of the vehicle in the vehicle floor. Each of the seats have a backrest part and a seat part, and are slidably attached to the rails by means of coupling members. The seats can be locked by way of the coupling members in a number of positions along the rails. The seat part of the seats is pivotably mounted in relation to the backrest part in such a way that it can assume a first, folded-down position and a second position wherein it is folded up against the backrest part. At least one rail extends essentially in the transverse direction of the vehicle. This transverse rail connects the rails extending in the longitudinal direction of the vehicle to each other in such a way that the seats can be moved, via the transverse rail, from engagement with one longitudinally extending rail to another.

7 Claims, 7 Drawing Sheets

VEHICLE SEAT ARRANGEMENT

CROSS REFERENCE TO RELATED APPLICATIONS

This is a continuation patent application of International Application Number PCT/SE99/02331 filed Dec. 14, 1999 that designates the United States and which claims priority to Swedish Application No. 9804561-0 filed Dec. 22, 1998. The full disclosure of PCT/SE99/02331, in its entirety, is hereby expressly incorporated by reference into the present application.

BACKGROUND OF INVENTION

1. Technical Field

The present invention relates to a seating arrangement for a vehicle having one or more seats that are arranged so that they can be moved between different mutual positions along one or more rails on the vehicle floor.

2. Background Information

Motor vehicles that quickly and easily adapt to varying loading and transporting requirements are in ever increasing demand from modern customer groups. Such vehicles are referred to by popular terms such as mini-van, multi-purpose vehicle ("MPV"), sports utility vehicle ("SUV"), etc.

Vehicles of the above-mentioned type are often provided with movable seats. These seats can be arranged in a number of different configurations adapted to the special activities and areas of use. The seats typically are secured to the vehicle floor via attachments which are more or less easy for the user to manipulate.

A problem with such known solutions is that the seats and other equipment secured to the floor can only be moved within the vehicle in a relatively limited number of ways. To achieve a considerable increase in the loading area of the vehicle, one or more seats typically have to be released from the floor and lifted out of the vehicle. Additional problems often arise when looking for a suitable place to store the seats that have been removed. In addition, the weight of the seats is often not inconsiderable, giving some users difficulty in handling the seats.

SUMMARY OF INVENTION

The present invention solves the above problems by making available a seating arrangement for a motor vehicle. This arrangement is comprised of a number of seats arranged so that they can be moved between different mutual positions along at least two parallel rails extending in the longitudinal direction of the vehicle in the vehicle floor. Each of the seats have a backrest part and a seat part and are slidably attached to the rails by means of coupling members. These coupling members enable the seats to be locked in a number of positions along the rails. The seat part of the seats is pivotably mounted in relation to the backrest part in such a way that it can assume a first, folded-down position and a second position in which it is folded up against the backrest part. At least one rail extends essentially in the transverse direction of the vehicle. This transverse rail connects the longitudinal rails to each other so that the seats can be moved, via the transverse rail, from engagement with one longitudinally extending rail to the another.

In a preferred embodiment of the invention, the seating arrangement comprises a driver's seat and at least three passenger seats. In a use position, a passenger seat is placed alongside the driver's seat and two passenger seats are placed behind the driver's seat and the passenger seats. In a storage position, are all placed alongside the driver's seat with the seat parts in the folded-up position.

According to a preferred embodiment, the vehicle has, in the traditional manner, a driver's side located on one side of the vehicle and a passenger side located on the opposite side of the vehicle. Rails extending in the longitudinal direction of the vehicle extend further forward in the vehicle on the passenger side than on the driver's side.

In an advantageous embodiment of the invention, the seating arrangement comprises a driver's seat and at least three passenger seats. In a use position, a passenger seat is placed alongside the driver's seat and two passenger seats are placed alongside each other behind the driver's seat. The two passenger seats placed behind the driver's seat are, in a storage position, placed close behind both the driver's seat and the passenger seat next to the driver'seat, with the seat parts in the folded-up position.

In a likewise advantageous embodiment of the invention, the seating arrangement has a driver's seat and at least three passenger seats. A passenger seat is placed alongside the driver's seat and two passenger seats are placed alongside each other behind the driver's seat. The two passenger seats placed behind the driver's seat can be moved between a first position in which they are secured, respectively, on one of the two parallel rails extending in the longitudinal direction of the vehicle, thereby defining a space between the two seats, and a second position, in which they are both secured along the transverse rail immediately next to each other.

Preferably, there are at least two pairs of parallel rails extending in the longitudinal direction of the vehicle that are arranged in the floor of the vehicle. Each pair of rails are preferably designed to cooperate with a seat's coupling member.

In addition, at least one pair of transverse rails is preferably arranged in the floor of the vehicle. Similar to the longitudinal rails, the pair of rails are designed to cooperate with a seat's coupling member.

In a preferred embodiment, the rails also have an essentially rectangular cross section.

Moreover, the rails preferably have a slot that is open at the top and parallel with the rails. The slot width should be smaller than the width of the rails so that a partially open guide track is defined within the rails for cooperation with the coupling members of the seats.

By virtue of the invention, the vehicle seats can be placed quickly and easily in a plurality of configurations as required for different use situations. The need to lift the seats out of the vehicle for separate storage in a garage or the like; which applied in certain previously known solutions, is completely eliminated.

Other features and advantages of the invention will become evident from the following description.

BRIEF DESCRIPTION OF DRAWINGS

The invention will be described below on the basis of an illustrative embodiment and with reference to the attached drawings, in which.

DETAILED DESCRIPTION

Figure 1:
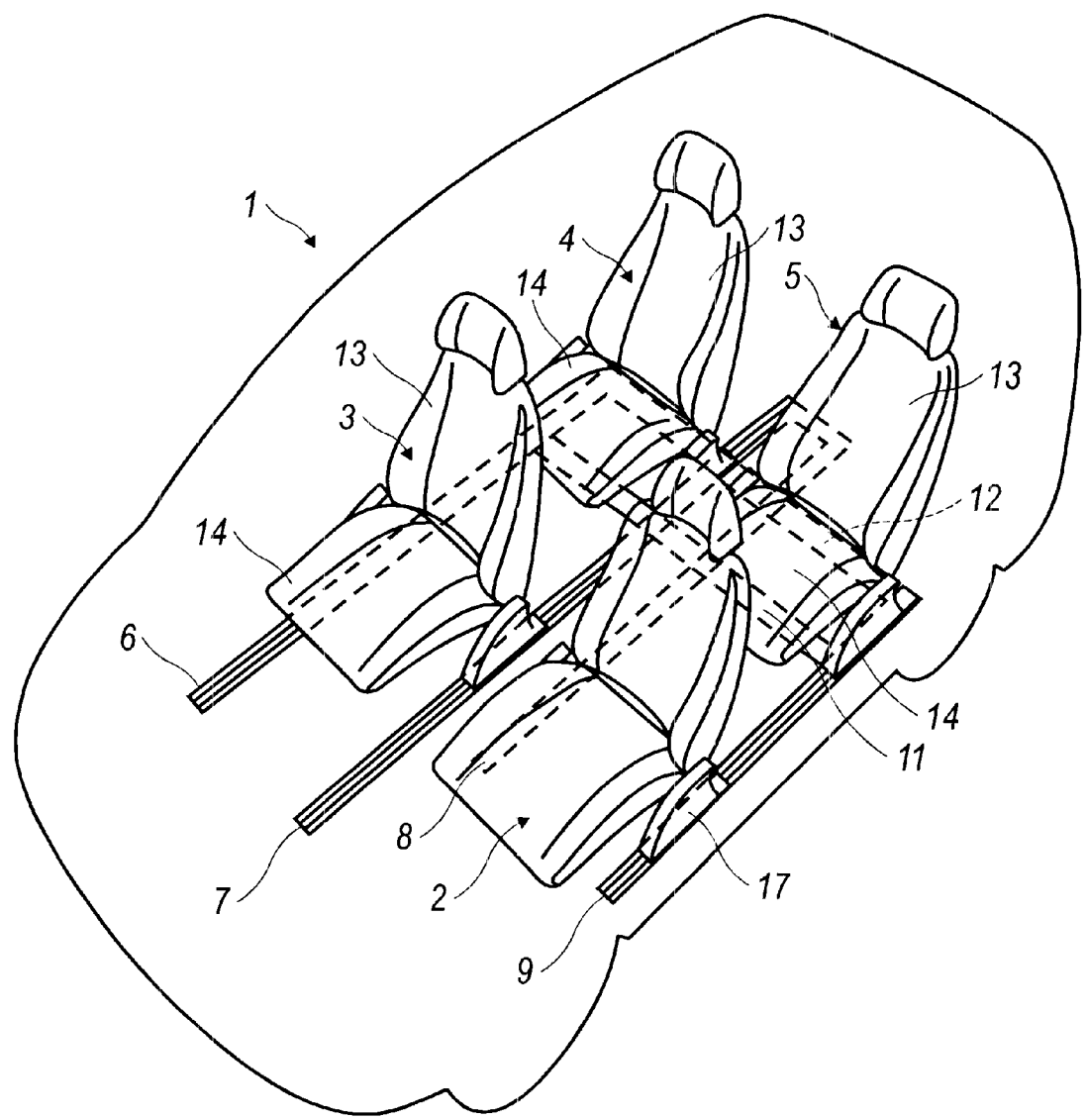
FIG. 1 illustrates a simplified perspective view of a seating arrangement according to the invention.

Referring to FIG. 1, reference number 1 generally designates a motor vehicle (as a simplified outline) provided with a seating arrangement according to a preferred embodiment of the invention. As illustrated, the seating arrangement has a driver's seat 2 on the driver's side, a front passenger seat 3 next to the driver's seat, and two back passenger seats 4, 5 placed behind the driver's and passenger seat 2, 3.

Figure 4:
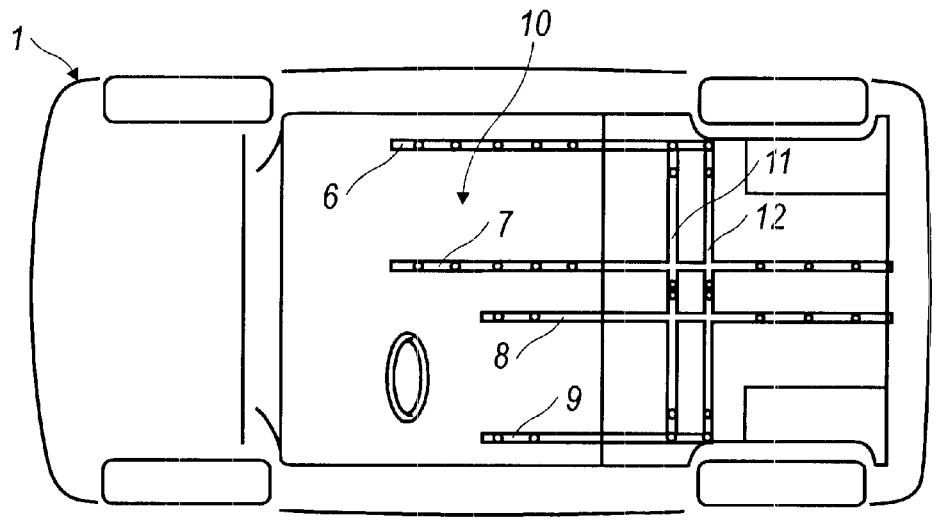
FIG. 4 illustrates a diagrammatic top plan view of a motor vehicle interior whose floor is provided with rails.

The seats 2, 3, 4, 5 can be moved between different mutual positions along four parallel rails 6, 7, 8, 9 that are recessed into the vehicle floor 10 and extend in the longitudinal direction of the vehicle 1. As illustrated, the rails 6, 7, 8, 9 are divided into at least two pairs, with the first pair 8, 9 extending along the driver's side of the vehicle 1 and the second pair 6, 7 extending along the passenger's side. In FIG. 1, those parts of the rails concealed by the seats are indicated by broken lines. In FIG. 4, the seats have been removed so that the extent of the rails 6, 7, 8, 9 is clearer.

There are also at least two rails 11, 12 that extend in the transverse direction of the vehicle 1. These parallel transverse rails 11, 12 connect the above-described longitudinal rails 6, 7, 8, 9 to each other so that the seats 2, 3, 4, 5 can be moved via these transverse rails 11, 12 from engagement with one pair of longitudinal rails 8, 9 to the second pair of longitudinal rails 6, 7.

Figure 2:
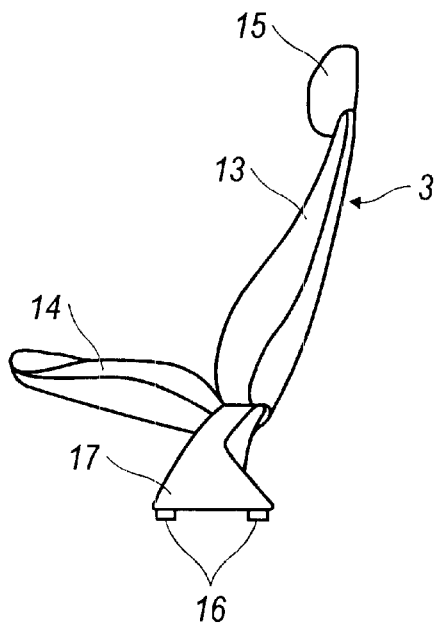
FIG. 2 illustrates a diagrammatic side view of a seat included in a seating arrangement according to the invention, comprising a seat part and a backrest part, and in which the seat part is in its folded-down position.
Figure 3:
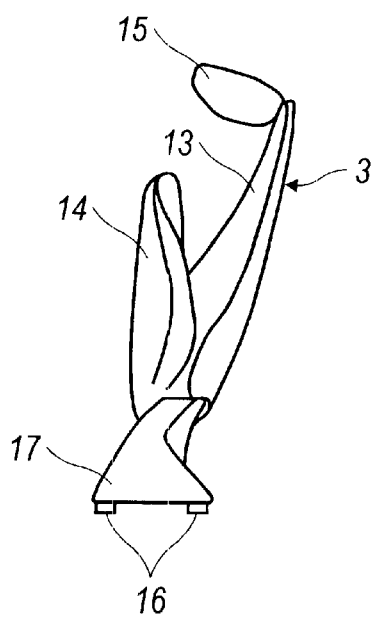
FIG. 3 illustrates the same seat as in FIG. 2, but with the seat folded up against the backrest part.

As can be seen from FIGS. 2 and 3, each seat 2, 3, 4, 5 has a backrest part 13, a seat part 14 and a headrest 15. The seats 2, 3, 4, 5 are preferably lightweight and slidably secured to the rails 6, 7, 8, 9, 11, 12 by means of coupling members 16. Using the coupling members 16, the seats 2, 3, 4, 5 can be locked in a plurality of positions along the rails 6, 7, 8, 9, 11, 12. The coupling members 16 are fixed on the underside of two base elements 17 to which the backrest part 13 and seat part 14 are also secured. The coupling members 16 are provided with locking members (not shown) with which they can be locked in a fixed position in relation to the rails 6, 7, 8, 9, 11, 12. The seat part 14 of the seats 2, 3, 4, 5 can be pivoted in relation to the backrest part 13 so that it can assume a first, folded-down position, as shown in FIG. 2, and a second position in which it is folded up against the backrest part, as shown in FIG. 3. FIG. 3 also illustrates that the headrest 15 can be folded forward to improve the rear view in the vehicle.

Figure 6:
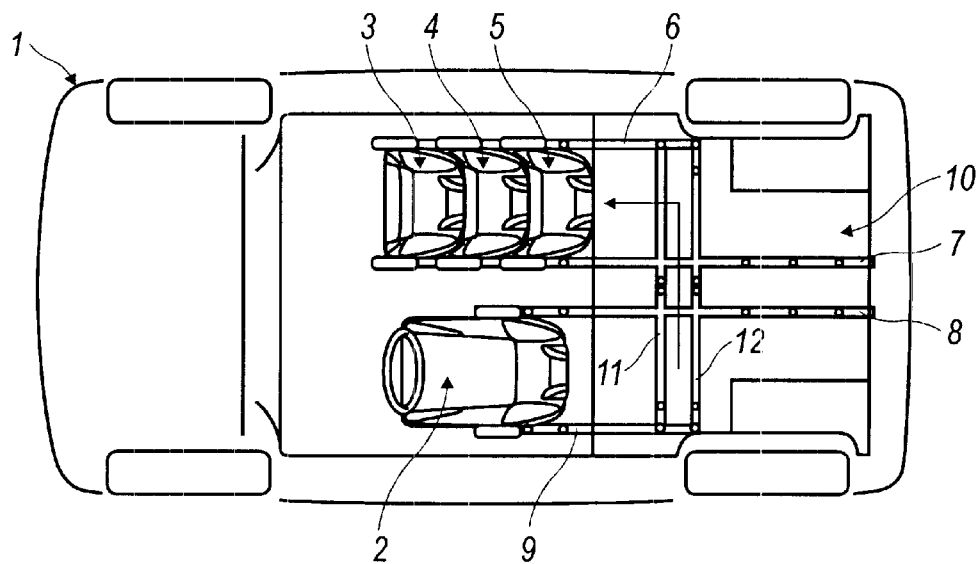
FIG. 6 illustrates a top plan view similar to that in FIGS. 4 and 5, where the three passenger seats have been moved along the rails to a storage position alongside the driver's seat, with the seat parts folded up.
Figure 7:
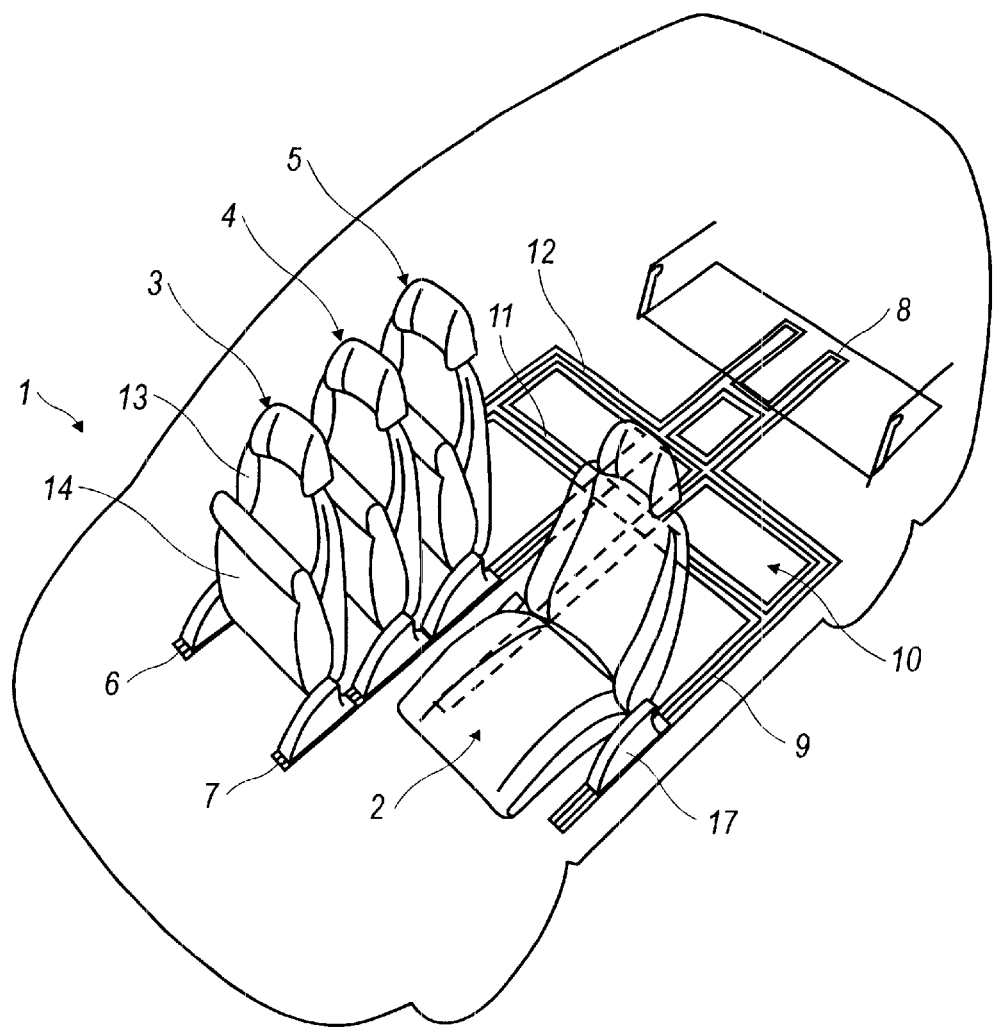
FIG. 7 illustrates a diagrammatic top perspective view of the storage position already shown in FIG. 6.

The seating configuration shown in FIGS. 1 and 4 is the normal use position for the vehicle. In this position a driver and three passengers can travel comfortably in the vehicle. However, if so required, the loading capacity of the vehicle can be considerably increased by means of the passenger seats 3, 4, 5—in a storage position—being stored alongside the driver's seat 2, with the seat parts 14 folded up, as is shown in FIGS. 6 and 7. Conversion to the storage position is easy to do by first folding up the seat part of the front passenger seat 3, then manipulating the coupling members 16 so that the seat 3 is released from its previously locked position alongside the driver's seat 2. The seat 3 is then pushed forward along the rails 6, 7 to a forward storage position in close proximity to the instrument panel (not shown) of the vehicle 1. The seat part 14 of the rear passenger seat 4 is then folded up against its backrest part 13, and then advanced in the same way along the rails 6, 7 to a forward storage position immediately behind the passenger seat 3 in front of it. Finally, the seat part 14 of the remaining passenger seat 5 (originally behind the driver's seat) is folded up against the backrest part 13. The seat 5 is then first pushed to the right in the transverse direction of the vehicle along the transverse rails 11, 12, and then pushed forward along the longitudinal rails 6, 7 to an advanced storage position immediately behind the passenger seat 4 in front. The backrest part 13 of the rearmost passenger seat 5 is essentially level with the backrest part 13 of the driver's seat 2, as shown in FIG. 7. In the embodiment shown, the longitudinal rails 6, 7 located on the passenger side are longer than corresponding rails 8, 9 on the driver's side so that the stored passenger seats 3, 4, 5 will have enough space alongside the driver's seat 2.

Figure 8:
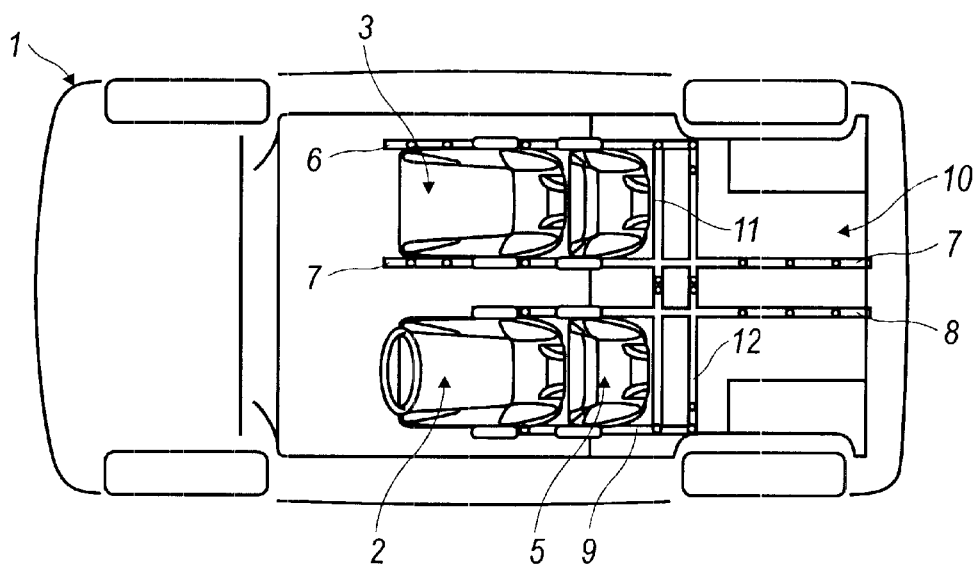
FIG. 8 illustrates a top plan view of a seating arrangement according to the invention where two passenger seats behind the driver's seat are placed in a storage position close behind the driver's seat and close behind the passenger seat adjacent to the driver's seat, with the seat parts folded up.

FIG. 8 illustrates a further storage position according to the invention, in which the two passenger seats 4, 5 behind the driver's seat 2 are placed close behind both the driver's seat 2 and passenger seat 3 alongside the driver's seat 2, with their seat parts 14 folded up. As such, a passenger can travel in the vehicle 1 while the loading space is at the same time increased.

Figure 10:
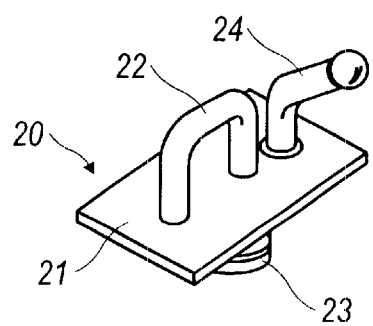
FIG. 10 illustrates a top perspective view of a load-securing member intended to be secured to the rails in a seating arrangement according to the invention.
Figure 9:
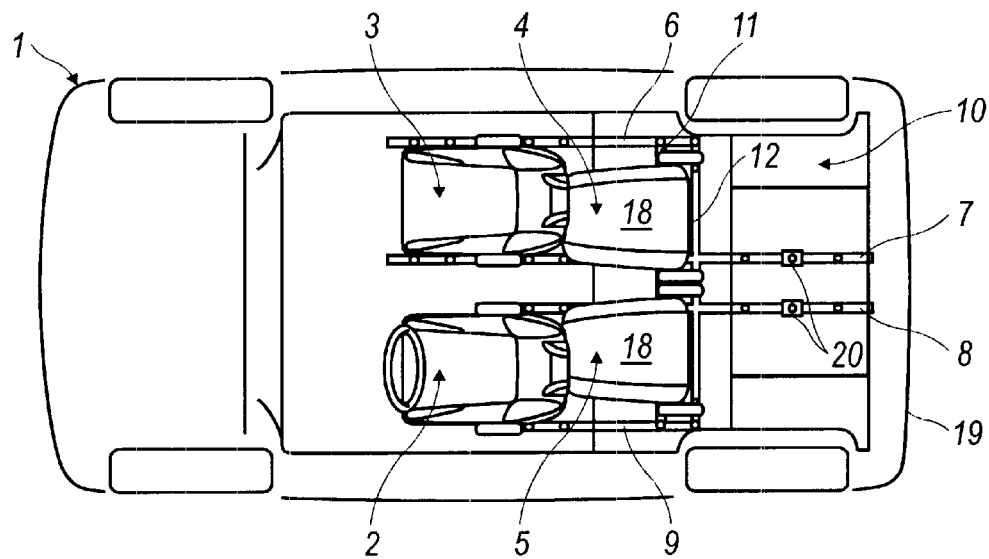
FIG. 9 illustrates a diagrammatic top plan view of a seating arrangement according to the invention where two passenger seats placed behind the driver's seat are folded forward so that the rear sides of their backrest parts form a loading surface.

FIG. 9 illustrates how the two passenger seats 4, 5 placed behind the driver's seat 2 can alternatively be folded forward so that the rear sides 18 of the backrest parts 13 form a loading surface. Although not shown, the passenger seat 3 alongside the driver's seat 2 can likewise be folded forwards. FIG. 9 also shows the two central longitudinal rails 7, 8 continued to the rear edge 19 of the vehicle 1, where they can advantageously be used for securing displaceable load-securing members 20 intended for securing a load by cooperation with load-securing belts or load-securing nets (not shown). Such a load-securing member 20 can preferably be designed according to the example shown in FIG. 10. In this example, the load-securing member consists of a base plate 21 on which there is an eye 22, a coupling pin 23 for engagement with the rails 7, 8, and a locking arm 24 by means of that the load-securing member 20 can be locked to or released from the rails 7, 8. Such load-securing members 20 can also be secured at a number of other positions both along the longitudinal rails 6, 7, 8, 9 and along the transverse rails 11, 12.

Figure 5:
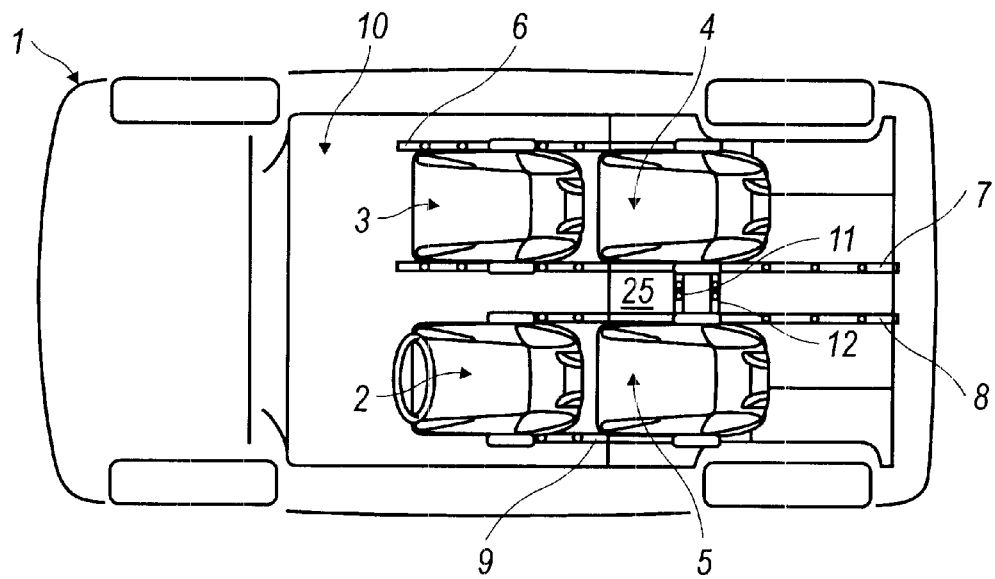
FIG. 5 illustrates a similar top plan view to that in FIG. 4 with a driver's seat and three passenger seats are secured in the rails in a preferred use position.
Figure 11:
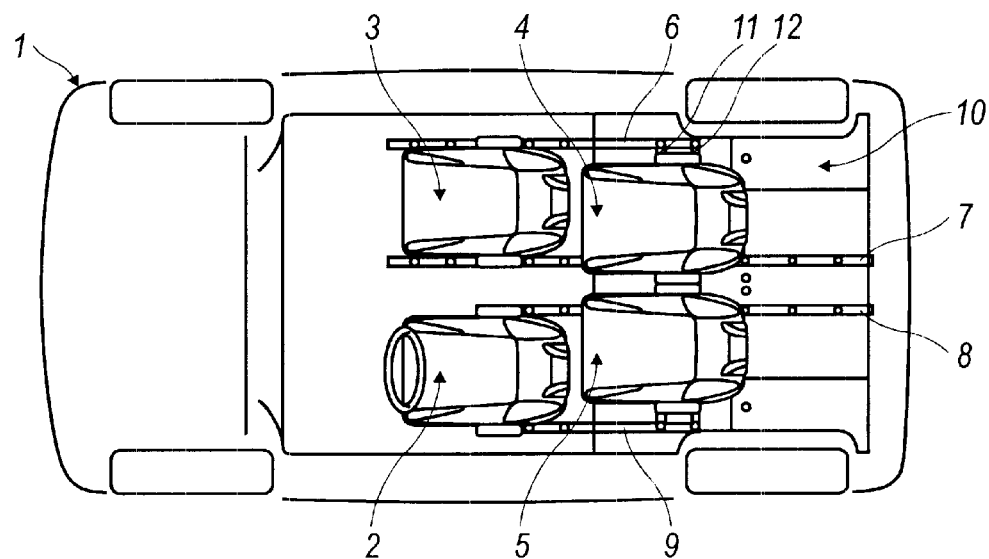
FIG. 11 illustrates a diagrammatic top plan view of a seating arrangement according to the invention where two passenger seats placed behind the driver's seat are secured immediately next to each other along the transverse rail, providing an improved forward view for passengers in the back seats.

Referring to FIGS. 5 and 11, the two passenger seats 4, 5 placed behind the driver's seat 2 can be moved between a first position, in which they are secured along each pair of longitudinal rails 6, 7 or 8, 7 thereby defining a space 25 between the two seats 4, 5 (as seen in FIG. 5), and a second position, in which they are both secured along the transverse rails 11, 12, immediately next to each other (as seen in FIG. 11). In the second position, the forward view for the passengers in the back seats is improved, while at the same time facilitating communication between the persons traveling in the vehicle.

Figure 12:
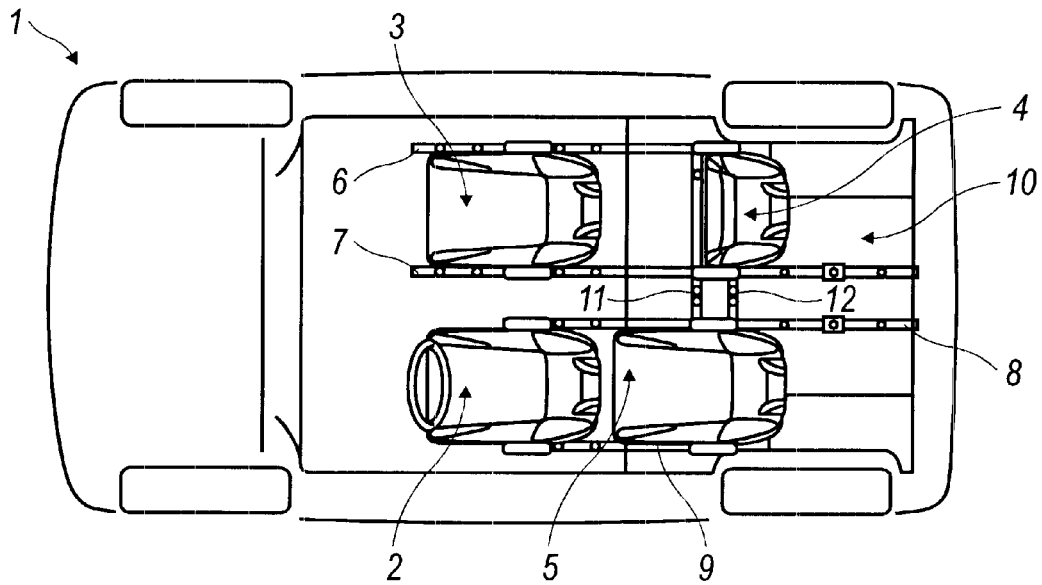
FIG. 12 illustrates a diagrammatic top plan view of a seating arrangement according to the invention where one of the back passenger seats has been changed to its folded-up position, and the front passenger seat has been moved backwards along the rails, for example, to provide extra space for a child's seat (not shown)

In FIG. 12, the rear passenger seat 4 behind the front passenger seat 3 has been changed to its folded down position and the front passenger seat 3 has been pushed back along the rails 6, 7 in order to provide extra space, for example, for a child seat (not shown).

Figure 13:
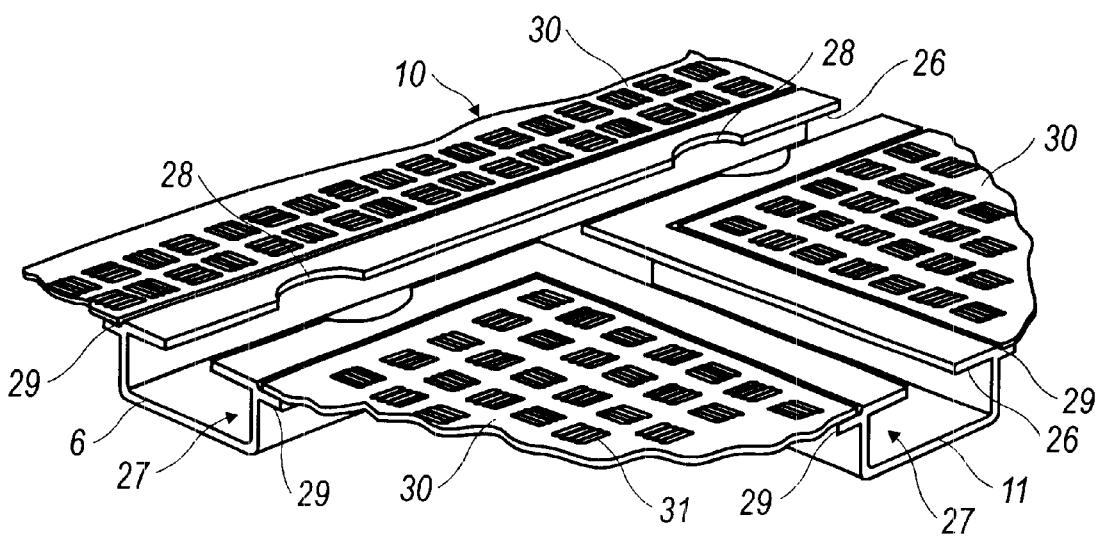
FIG. 13 illustrates a partial top perspective view of a vehicle floor provided with rails according to the invention. The figure clearly shows how a transverse rail is joined to a rail extending in the longitudinal direction of the vehicle.

FIG. 13 illustrates part of the floor 10 of the vehicle 1. From FIG. 13, it is seen that the rails 6, 11 have a rectangular cross section and a slot 26, which is open at the top and parallel to the rails and whose width is smaller than the width of the rails, in such a way that a partially open guide track 27 is defined within the rails for cooperation with the coupling members 16 of the seats 2, 3, 4, 5 (not shown in the figure). Where two rails intersect, for instance as shown here between the longitudinal rail 6 and the transverse rail 11, the rails 6, 11 meet in such a way that their guide tracks 27 communicate with each other. In this way, the coupling members 16 of the seats 2, 3, 4, 5 can slide freely in the guide tracks 27 from one rail 11 to the other rail 6. The rails 6, 11 are further provided with a number of widened openings 28 (circles in the example shown) for passage of the coupling members 16 or coupling pins 23 of the seats 2, 3, 4, 5 on load-securing members 20 (see FIG. 10).

As seen from FIG. 13, the rails 6, 11 are recessed into the floor 10. As such, the rails 6, 11 have two lateral projections 29, one on each side of each rail, forming support surfaces for floor plates 30. The floor plates are advantageously embossed with a non-slip pattern 31 in order to increase the friction with the floor 10. The rail material is preferably aluminum, although steel may also be used. The material of the floor plates 30 is preferably aluminum or plastic. Alternatively, floor plates made of aluminum can be covered with a wear-resistant, friction-enhancing rubber material.

There are further alternative embodiments. For example, the seats 2, 3, 4, 5 may run on just a single rail instead of the two shown above. The coupling members 16 may be provided with rollers for facilitating the movements of the seats. Moreover, the number of seats may differ from that shown, for example, six, eight, or an odd number, such as five, or seven, in which cases the above-described storage positions are assumed in accordance with the principle of the invention. Moreover, the seats can alternatively be arranged in a greater number of parallel rows running in the longitudinal direction of the vehicle than the two rows illustrated. For example, a central, third row of seats can be arranged between the two rows shown. The storage position shown in FIGS. 6 and 7 in this case entails the stored passenger seats being arranged in two rows alongside the driver's seat 2.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. A seating arrangement for a motor vehicle comprising:
   at least two seats, each seat having a backrest part and a seat part;
   at least two parallel rails extending in a longitudinal direction of the vehicle in the vehicle floor, along which said seats are slidably attached and can be moved between different mutual positions; and
   coupling members for attachment of the seats to the rails and by which the seats can be locked in a number of positions along the rails;
   wherein said seat part is pivotably mounted in relation to said backrest part in such a way that it can assume a first, folded-down position and a second, folded-up position against the backrest part; and
   at least one rail extending substantially in a transverse direction of the vehicle, said transverse rail connecting said longitudinal rails to each other, wherein said seats can be moved via said transverse rail from engagement with one longitudinally extending rail to another longitudinally extending rail.

2. The seating arrangement according to claim 1 further comprising a driver's seat and at least three passenger seats,
   wherein in a use position a passenger seat is placed alongside the driver's seat and two passenger seats are placed behind the driver's seat, and
   further wherein in a storage position the passenger seats are placed alongside said driver's seat with said seat parts in said folded-up position.

3. The seating arrangement according to claim 1 further comprising a driver's side on one side of the vehicle and a passenger side on the opposite side of the vehicle,
   wherein said longitudinal rails extend further forward on the passenger side than on the driver's side.

4. The seating arrangement according to claim 1 further comprising a driver's seat and at least three passenger seats,
   wherein, in a use position, a passenger seat is placed alongside said driver's seat and two passenger seats are placed alongside each other behind said driver's seat,
   wherein, in a storage position, the two passenger seats placed behind the driver's seat are placed close behind both said driver's seat and said passenger seat placed alongside the driver's seat with said seat parts in said folded-up position.

5. The seating arrangement according to claim 1 further comprising a driver's seat and at least three passenger seats,
   wherein a passenger seat is placed alongside said driver's seat and two passenger seats are placed alongside each other behind the driver's seat, and
   further wherein said two passenger seats placed behind said driver's seat are able to be moved between a first position wherein they are secured on one of said two parallel longitudinal rails thereby defining a space between said two seats, and a second position wherein they are secured along said transverse rail substantially immediately next to each other.

6. The seating arrangement according to claim 1 wherein said rails have an essentially rectangular cross section.

7. The seating arrangement according to claim 1 wherein said rails have a slot that is open at the top and parallel with a longitudinal extent of said respective rails and whose width is smaller than the width of the rails, thereby defining a partially open guide track within the rails for cooperation with said coupling members of said seats.

* * * * *